Aug. 28, 1951     E. A. McCOY     2,565,615
TRACTOR INCLINOMETER
Filed Nov. 2, 1949
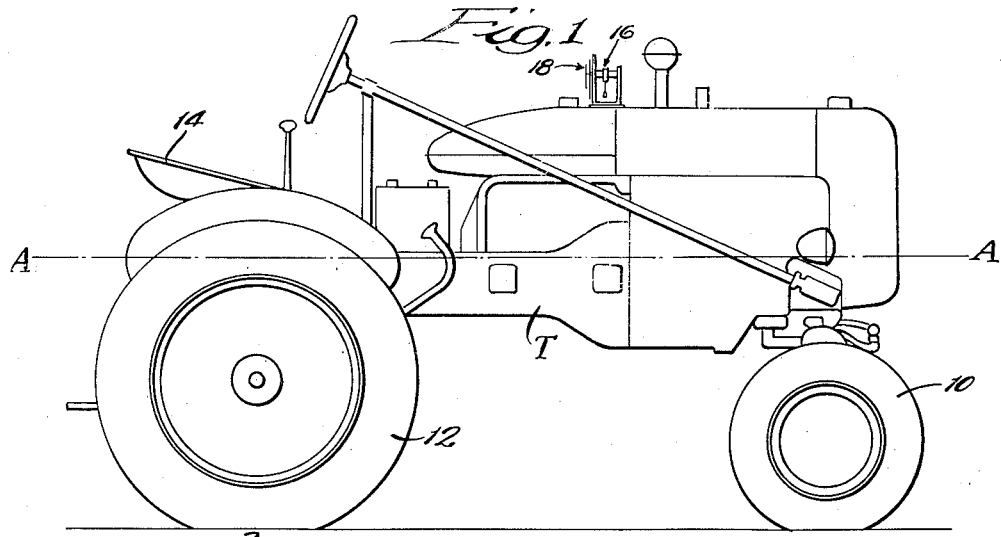
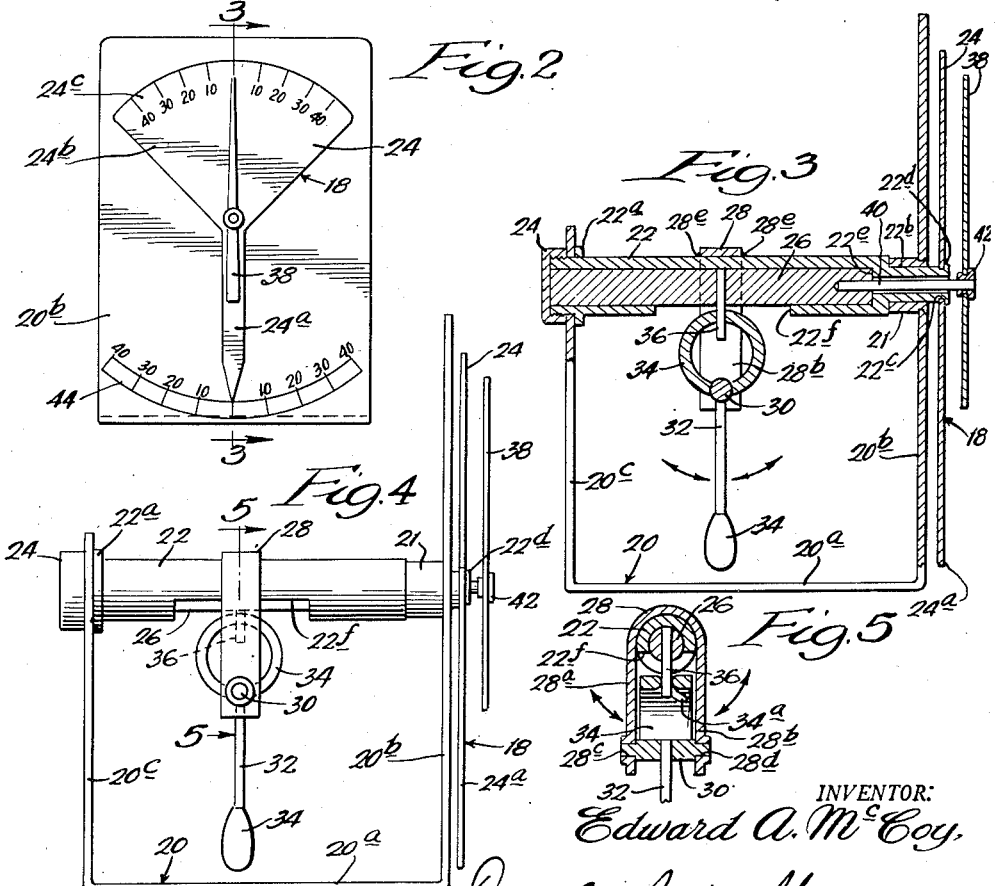
INVENTOR:
Edward A. McCoy,
BY Dawson, Ons Brith and Spangenberg,
ATTORNEYS.

Patented Aug. 28, 1951

2,565,615

UNITED STATES PATENT OFFICE 2,565,615

TRACTOR INCLINOMETER

Edward A. McCoy, La Crosse, Wis.

Application November 2, 1949, Serial No. 124,989

6 Claims. (Cl. 33—215)

My invention relates to an improved inclinometer for tractors and the like capable of indicating both lateral and longitudinal tilt and particularly suitable for use in contour plowing.

In contour plowing it is not only necessary to draw the plow along a line having a predetermined degree of lateral slope but, in addition, the tractor must be pointed in direction to maintain movement along that line. The structure of the present invention forms a convenient device to accomplish this result for both lateral and longitudinal tilt of the tractor are indicated in a manner convenient for observation by the operator so that he may readily guide the tractor to maintain the requisite degree of lateral tilt.

It is therefore a general object of the present invention to provide an improved inclinometer for tractors and the like particularly suitable for contour plowing.

A further object of the present invention is to provide an improved inclinometer for tractors and the like capable of giving a simple indication of both the lateral tilt and the longitudinal tilt of the tractor in a manner particularly convenient to the operator.

Another object of the present invention is to provide a simple self-contained inclinometer for use on a tractor and having a high degree of reliability and ability to withstand the shock and vibration incident to tractor operation.

The novel features which I believe to be characteristic of my invention are set forth with particularity in the appended claims. My invention itself, however, can best be understood by reference to the following description taken in connection with the accompanying drawing, in which:

Figure 1 is a side elevational view of an inclinometer of the present invention mounted on a tractor;

Figure 2 is an enlarged view of the indicator mechanism of the inclinometer of Figure 1;

Figure 3 is a cross-sectional view through the axis 3—3, Figure 2;

Figure 4 is a side elevational view of the inclinometer of Figure 1; and,

Figure 5 is a fragmentary cross-sectional view through axis 5—5, Figure 4.

Referring now to Figure 1 there is shown generally at T a tractor having front steering dirigible wheels 10 and rear tractive wheels 12. The driver sits in a suitable saddle or seat 14 located rearwardly on the tractor.

The inclinometer of the present invention is shown generally at 16. It has a dial indicated generally at 18 facing rearwardly to be viewed by the operator. While the exact position of mounting the inclinometer is not critical, it will be noted that in the position shown, the dial 18 is readily visible to the driver without unduly interfering with his view.

The construction of the inclinometer may best be understood by reference to Figures 2 to 5. As shown, a U-shaped support plate 20 has a flat center portion 20a located between the front vertical support wall 20b and the back vertical support wall 20c. As shown in Figure 3, the walls 20c and 20b have aligned openings to receive the longitudinal hollow shaft 22. At its rear end, this shaft has a wall 22a to hold it against backward movement and is threaded on the opposite side of the wall 20c to receive the threaded cap 24 which restrains forward motion relative to wall 20c.

The shaft 22 has a reduced portion 22b at its front end where it passes through the wall 20b. Wall 20b is provided with a collar 21 that receives this reduced portion of shaft 22 and fits against the shoulder formed by the reduced portion 22b to anchor shaft 22 against forward movement relative to the wall 20b.

Shaft 22 extends through the front wall 20b and receives the indicator 24 which is one part of the dial mechanism indicated generally at 18. As seen best in Figure 3, the indicator 24 fits on a further reduced portion 22c of the shaft 22 and the shaft is peened over at 22d to hold the indicator for movements with the shaft.

The shaft 22 is hollow and defines a cavity to receive the stub shaft 26. Shaft 26 is held in position by the cap 24 and the shoulder 22e in the hollow portion of the shaft 22. The shaft 22 is broken away at its lower portion to define the window 22f. A U-shaped saddle 28 extends over the portion of the shaft 22 adjacent the window 22f and hangs down at arms 28a and 28b, Figure 5. The arms 28a and 28b have aligned bearing openings 28c and 28d, respectively, to receive the shaft 30.

Arm 32 depends from the shaft 30 and sustains the weight 34 at its lower end. This weight defines a pendulum in conjunction with the arm 32.

The saddle 28 is secured against rotation relative to the shaft 22 by one or more welded beads 28e, Fig. 3.

The pendulum is free to swing about either of two axes. One axis is the axis of the shaft 22 and the saddle 28 partakes of the rotation. The other axis is the axis of the shaft 30 and the saddle 28 and shaft 22 do not partake of the rotation. Rotation about the axis of the shaft 22 corresponds to lateral tilt or pitch of the tractor and rotation about the axis of shaft 30 corresponds to longitudinal tilt.

The shaft 26 rotates in accord with the degree of swing of arm 32 about axis 30 (longitudinal tilt of the tractor). This is accomplished by the round cam 34 which has a helical slot 34a. A pin 36 is fitted in the shaft 26 and extends into the slot 34a as shown in Figs. 3 and 5. Consequently, as the inclinometer (and tractor) tilt to cause the pendulus weight 34 to swing shaft 30 about the bearings 28c and 28d the shaft 26 executes corresponding rotations about its axis in response to the rocking movements of the cam follower pin 36.

The indicator needle 38 moves in unison with the shaft 26. This is achieved by the pin 40 which is received in a suitable opening in the front end of the shaft 26. This pin receives the collar 42 which in turn supports needle 38.

As shown in Fig. 2, the indicator 24 has a depending needle portion 24a which cooperates with the arcuate scale 44 marked on the front face of the front wall 20b. This indicator has an upper sector portion 24b bearing an arcuate scale 24c as shown. The needle 38 cooperates with this scale.

*Operation*

When the tractor is in a level position, such as shown in Fig. 1, there is no tilt either about longitudinal axis A—A or the transverse axis parallel to the axis of the rear wheels 12. In this condition, the pendulus weight 34 lies directly below the axis of shaft 22 and the shaft 30. The needle 38 is upright and the needle portion 24a of the indicator 24 extends directly downward. As shown in Fig. 2, the needles indicate zero on scale 24c and scale 44, showing that the tractor is not tilted about either its longitudinal or transverse axis.

If the tractor T is tilted about the longitudinal axis A—A, the weight 34 swings about the axis of shaft 22, thereby rotating that shaft and the indicator 24. The needle portion 24a of the indicator then registers with the marking on the scale 44 corresponding to the degree of transverse tilt. The shaft 26 rocks in unison with the shaft 22 because of the coupling that can be traced from the shaft 30 to cam 34 and cam follower pin 36 to shaft 26. Since the weight 34 does not rock about the shaft 30 this time, the pin 36 is confined to its centered position shown in Fig. 5 and causes the shaft 26 to rotate in unison with the shaft 22.

The movement of the shaft 26 as the tractor tilts about its longitudinal axis causes the needle 38 to move in unison with the indicator 24. Consequently, the needle 38 still indicates zero on the scale 24c.

When the tractor tilts about its transverse axis (namely, an axis parallel to the axis of wheels 12), the pendulus weight 34 swings backwardly or forwardly about axis of the shaft 30, but does not swing relative to the axis of the shaft 22. Shaft 22 and saddle 28 accordingly do not move. The indication of pointer 24a on the scale 44 is thus not altered. However, the rocking movement of the shaft 30 is communicated to the shaft 26 by cam 34 and pin 36 to cause shaft 26 to rock in accord with the degree of swing of the weight 34. This causes the needle 38 to rotate and point to an indication on the scale 24c corresponding to the degree of tilt about the transverse axis.

When combined longitudinal and transverse tilt occurs, the indication on scale 44 corresponds to the degree of tilt about the longitudinal axis and the indication on scale 24c corresponds to the degree of tilt about the transverse axis.

In contour plowing it is usually desirable to draw the plow along a line having a predetermined degree of tilt about the longitudinal axis of the plow. This causes the earth to be thrown in the most efficient manner, either directly down the slope or directly up the slope. However, it is not possible to direct the tractor along this line alone for the lateral pull of the plow causes the tractor to climb up or down the slope as the case may be. With the mechanism of the present invention, the tractor is readily directed through the degree of lateral tilt without climbing up or down the hill. This is accomplished by steering the tractor in the lateral tilt and at the same time maintain the corresponding longitudinal tilt as required to maintain the contour. Thus, if the measured lateral tilt is, say, five degrees, the tractor is steered to maintain that tilt and, at the same time the corresponding longitudinal tilt (say two degrees) is maintained.

From the foregoing description it will be apparent that I have provided an improved tractor inclinometer particularly suitable for contour plowing. Moreover, the device is self-contained and readily mountable at many points on the tractor. In addition, it is simple and rugged and adapted to use on the farm.

While I have shown and described a specific embodiment of my invention, it will of course be understood that by the appended claims I intend to cover all variations and alternative constructions falling within the true spirit and scope of my invention.

What I claim as new and desire to secure by Letters Patent of the United States:

1. An inclinometer for use on tractors or the like comprising in combination, a frame bearing a first scale, an indicator rockable about a predetermined axis relative to the frame, said indicator having a pointer cooperative with the scale and bearing a second scale, means to rock the indicator in accord with the tilt of the frame about one axis, a needle rockable about said predetermined axis relative to the frame and the indicator and cooperative with the scale on the indicator, and means operative to rock the needle relative to the indicator in accord with the tilt of the frame about an axis transverse to the first axis.

2. In combination, a tractor, an inclinometer mounted on the tractor, said inclinometer having a member bearing a scale in fixed position relative to the tractor, an indicator having a pointer cooperative with said scale, means operative to rock the indicator about a predetermined axis in accord with the tilt of the tractor about its longitudinal axis, a needle rockable about said predetermined axis relative to the tractor and the indicator and cooperative with the scale on the indicator, and means operative to rock the needle relative to the indicator in accord with the tilt of the tractor about the transverse axis and in unison with the rotation of the indicator in response to tilt of the tractor about the longitudinal axis.

3. In an inclinometer for tractors and the like, the improvement comprising a frame having a front wall portion bearing a scale, a shaft carried by said frame, an indicator mounted on said shaft and having a pointer portion cooperative with said scale, said indicator bearing a scale, a second shaft coaxial with said first shaft, a pointer on said second shaft cooperative with said last scale, and means to rotate said shafts in unison in accord with the tilt of said frame about one axis and to rotate said second shaft in accord with the tilt of said frame about an axis transverse to said one axis.

4. In an inclinometer for tractors and the like the improvement comprising a pair of coxial shafts, the outer shaft having a window, a saddle secured to the outer shaft adjacent said window, a pendulus weight depending from and attached to said saddle, means interconnecting said saddle to the inner shaft to rotate that shaft in accord with the tilt of the weight about an axis transverse to the axis thereof, an indicator bearing a scale mounted for rotation in unison with the first shaft, and a needle mounted for rotation in unison with the last shaft and cooperatively associated with said scale.

5. An inclinometer for tractors and the like comprising a frame bearing a scale, a pair of coaxial shafts mounted transversely to said scale, the outer shaft having a window, a saddle attached to said outer shaft adjacent said window, a shaft carried by said saddle and oriented transversely of said first shaft, a pendulus weight attached to said last shaft, means interconnecting said last shaft and the inner of said coxial shafts operative to rotate said inner shaft in accord with the rotations of said last shaft, an indicator bearing a scale mounted for rotation in unison with the outer shaft, said indicator having a pointer cooperative with the scale on said frame, and a needle mounted for rotation in unison with the said inner shaft and cooperatively associated with the last scale on said indicator.

6. An inclinometer for tractors and the like comprising in combination a frame bearing a first scale, a pair of coaxial shafts, the outer of said shafts having a window, a saddle attached to said shaft in registry with said window, a pendulus weight carried by said saddle for rocking motions about an axis transverse to said shafts, a pin on the inner shaft extending through the window, a cam attached to said weight and having a slot receiving said pin to rotate the inner shaft in response to the rotations of the weight about the axis transverse to said shafts, an indicator bearing a scale and defining a pointer cooperative with the first scale, a needle cooperative with the scale on said indicator, means to rotate the indicator in unison with the outer shaft and means to rotate the needle in unison with the inner shaft.

EDWARD A. McCOY.

REFERENCES CITED

The following references are of record in the file of this patent:

UNITED STATES PATENTS

| Number | Name | Date |
|---|---|---|
| 1,346,547 | Lackland | July 13, 1920 |
| 1,946,072 | Horlacher | Feb. 6, 1934 |
| 2,323,693 | Walton | July 6, 1943 |
| 2,352,758 | Bauknecht | July 4, 1944 |

FOREIGN PATENTS

| Number | Country | Date |
|---|---|---|
| 138,221 | Great Britain | 1920 |
| 260,623 | Germany | 1913 |
| 368,495 | Germany | 1923 |